United States Patent
King et al.

(10) Patent No.: US 12,023,606 B2
(45) Date of Patent: Jul. 2, 2024

(54) TEXTURED CORE SHEETS FOR FLUID DRAINAGE UNIT

(71) Applicant: Eljen Corporation, Windsor, CT (US)

(72) Inventors: James M. King, Ellington, CT (US); Scott Moore, Oxford, CT (US)

(73) Assignee: Eljen Corporation, Windsor, CT (US)

( * ) Notice: Subject to any disclaimer, the term of this patent is extended or adjusted under 35 U.S.C. 154(b) by 336 days.

(21) Appl. No.: 17/444,767

(22) Filed: Aug. 10, 2021

(65) Prior Publication Data

US 2022/0062799 A1     Mar. 3, 2022

Related U.S. Application Data

(60) Provisional application No. 63/073,250, filed on Sep. 1, 2020.

(51) Int. Cl.
| | |
|---|---|
| *B01D 29/00* | (2006.01) |
| *B01D 29/01* | (2006.01) |
| *B01D 29/03* | (2006.01) |
| *B01D 39/16* | (2006.01) |
| *E02B 11/00* | (2006.01) |

(52) U.S. Cl.
CPC ......... *B01D 29/031* (2013.01); *B01D 29/012* (2013.01); *B01D 39/1692* (2013.01); *B01D 2239/0654* (2013.01); *B01D 2239/069* (2013.01); *B01D 2239/10* (2013.01)

(58) Field of Classification Search
CPC .......... E02B 11/00; E02B 11/02; B31B 50/00; B31B 50/59; B31B 2120/00; B31B 2120/10; B31B 2120/20; B31B 2120/60; B32B 1/00; B32B 3/00; B32B 5/00; B32B 2439/00; B32B 2439/02; B32B 2439/40; B32B 2439/70; B32B 2553/00; B01D 39/00; B01D 39/14; B01D 39/16; B01D 39/1607; B01D 29/031; B01D 29/012
USPC ........................... 405/43, 36, 48, 49, 50, 45
See application file for complete search history.

(56) References Cited

U.S. PATENT DOCUMENTS

| | | | | |
|---|---|---|---|---|
| 3,963,813 | A | * | 6/1976 | Keith ........................ B32B 3/28 264/165 |
| 4,587,147 | A | | 5/1986 | Keith |
| 4,639,165 | A | | 1/1987 | Flecknoe-Brown |

(Continued)

FOREIGN PATENT DOCUMENTS

WO     8302790 A1     8/1983

OTHER PUBLICATIONS

AGRU America, "MicroDrain® Integrated Drainage System Geomembrane for High Flow Rates and Reliable Drainage," Oct. 8, 2018, retrieved from https://agruamerica.com/resource/agru-microdrain/.

(Continued)

*Primary Examiner* — Allison G Fitzsimmons
(74) *Attorney, Agent, or Firm* — Alix, Yale & Ristas, LLP

(57) ABSTRACT

A core sheet includes a primary textured surface and separate secondary cuspations or corrugations. The core sheets are configured for use within a fluid or wastewater treatment unit that typically includes one or more fabric layers. The primary textured surface enhances retention of wastewater fluid received by the unit, which over time causes an increase in build-up of biomatter on the surface, which in turn enhances the efficacy of treatment of the wastewater.

28 Claims, 6 Drawing Sheets

(56) References Cited

U.S. PATENT DOCUMENTS

| | | | |
|---|---|---|---|
| 4,885,201 A | 12/1989 | Brandt | |
| 5,258,217 A | 11/1993 | Lewis | |
| 5,728,424 A | 3/1998 | Walling | |
| 6,164,868 A | 12/2000 | Goughnour | |
| 9,809,941 B1 * | 11/2017 | Donlin | E03F 1/002 |

OTHER PUBLICATIONS

GSE Environmental, "HDPE Textured Geomembranes," retrieved on Sep. 9, 2020 from www.gseworld.com/Products/Geomembranes/HDPE-Textured/.

ABS-GEOPRO, "Textured HDPE Geomembrane," Mar. 27, 2019, retrieved from https://abs-geopro.com/2019/03/27/textured-hdpe-geomembrane/.

* cited by examiner

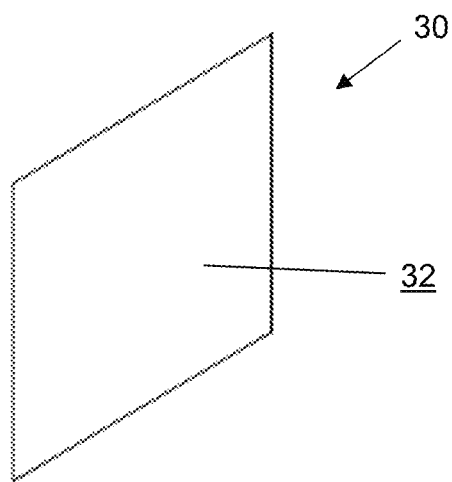
Figure 1
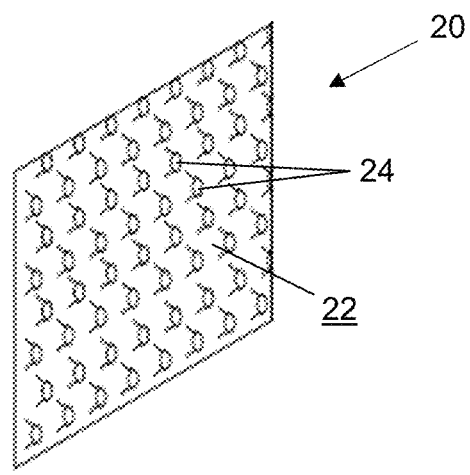
Figure 2 – Prior Art

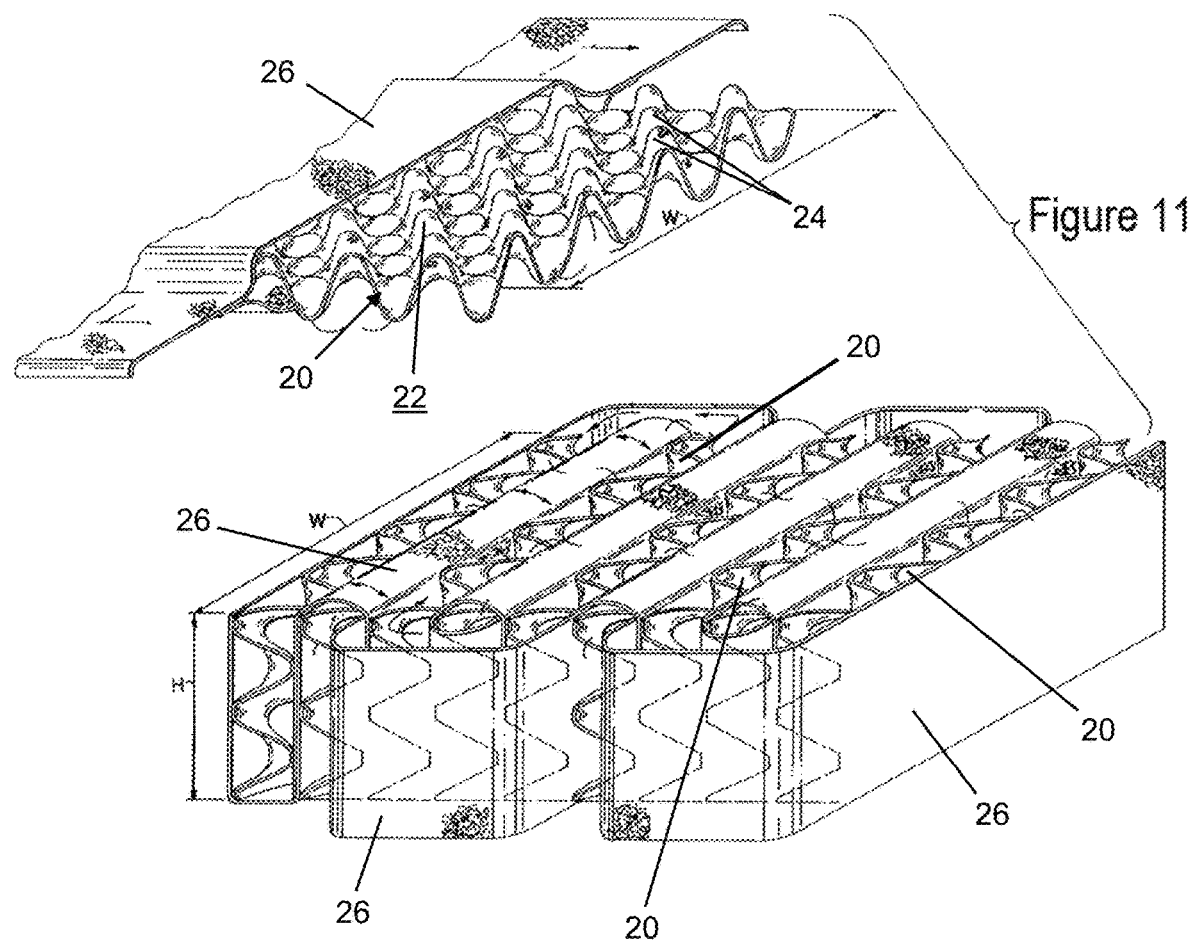
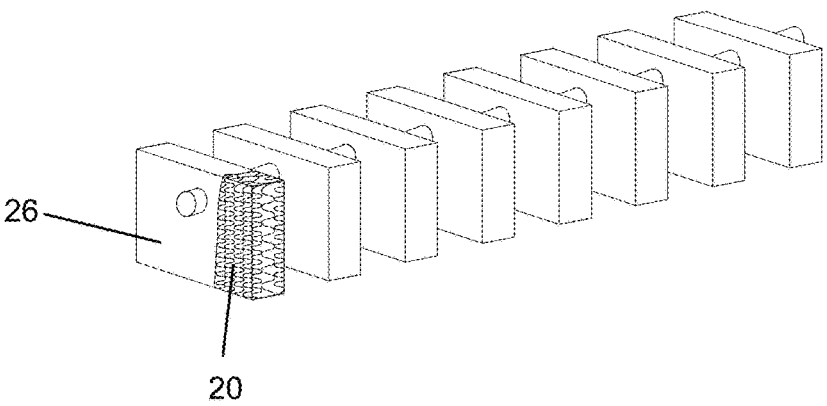
Figure 12

TEXTURED CORE SHEETS FOR FLUID DRAINAGE UNIT

BACKGROUND

The present disclosure relates generally to the field of subsoil fluid drainage, absorption and treatment systems. More particularly, the disclosure relates to embodiments of a core sheet material used for support or in other manners in treatment systems that has a textured surface, and optionally secondary surface cuspations.

One type of conventional subsoil fluid absorption systems are comprised of trenches or excavations filled with small rock aggregate and overlaid with a perforated pipe. The pipe may be overlaid with a geotextile fabric and/or more rock aggregate. Soil is placed over the aggregate and perforated pipe to fill the trench to the adjoining ground level. In use, fluid flows through the pipe and out the perforations. Fluid is held within cavities in the aggregate until it can be absorbed into the soil. Other conventional systems use hollow plastic chambers placed beneath ground level to hold fluid until the fluid can flow through slits or apertures in the chamber and can be absorbed into the soil. Further systems exist that utilize a core inner support material wrapped in fabric or sandwiching fabric layers. In such systems, the core inner support material is often made up of sheets of rigid or semi-rigid inert material, such as plastic, that may be positioned in a substantially face to face alignment.

Another known use for the core sheets is within aerobic treatment units (ATUs), wherein core sheets are assembled in an upright configuration within a tank with effluent being directed to move over the core sheets. In such ATU systems, fluid treatment is often aided by incorporation of an air blower in the vicinity of the core sheets. Core sheets may additionally be incorporated into fluid treatment systems between a pipe and a receiving unit to assist in fluid distribution to the treatment media. Some such systems utilize one or more core sheets wrapped around a distribution pipe to aid in distribution.

Particularly effective wastewater treatment systems are manufactured and sold by Eljen Corporation of Windsor, Connecticut, under the name GSF and Mantis®. Within GSF systems, cuspated core sheets of differing thickness are arranged parallel to one another with treatment fabric vertically positioned between adjacent sets of core sheets and over the top of alternating sets of core sheets. Within the Mantis® systems, individual modules formed from internal core sheets wrapped with treatment fabric are spaced apart from one another along a support pipe that passes through the center of each module. In each type of system, modules include a support structure made from a series of cuspated polymeric core sheets with a treatment fabric wrapped around the support structure. In these systems, a fluid conduit, such as a support pipe, delivers wastewater to the interior of the modules. To this point, the central core sheets all have smooth primary surfaces and relatively large cuspations or projections, which may project from one side to the other or in both directions, similar to the design of an egg crate. The primary utility of the core sheets is to provide structural integrity for a system or a module in the system while allowing fluid and air to flow relatively freely into the space between layers of fabric.

Drainage systems, like the fabric-based systems described above, are placed within an excavated section of property, typically in a substantially flat alignment, and then the excavation is backfilled with soil or sand. In these treatment systems, one key consideration for treatment efficacy is the surface contact between the outer fabric of the modules and the surrounding soil. Over time, organic deposits develop on the surface of the fabric (the interface between the fabric and surrounding soil), commonly referred to as a biomat layer. The biomat layer is a significant contributor for naturally treating bio-related fluid, such as septic fluid or drainage, in the soil. Thus, it is highly advantageous to increase or maximize the biomat surface area and any additional comparable buildup of organic deposits.

As such, it would be useful to have a core material that promotes adherence and retention of bio-impacted fluid, thereby encouraging growth of additional organic deposits and biological material useful for natural passive treatment of wastewater on the core sheets. Such a core material would necessarily improve the treatment efficacy of the wastewater treatment system within which it is incorporated.

SUMMARY

In one embodiment, fluid treatment unit comprises one or more core sheets and optionally one or more layers of fabric. The core sheets are arranged adjacent and substantially parallel to one another and each has an outer surface. The one or more layers of fabric are around the one or more core sheets. The core sheets have a primary surface texture on substantially the entire outer surface. The core sheets may additionally include secondary corrugations in one or more directions of the sheet. The fluid treatment unit is configured for the core sheets to receive wastewater when connected to a source.

In another embodiment, a core sheet for use within a fluid treatment unit that is configured to allow fluid to contact the core sheet when installed and connected to a fluid source includes an outer surface with a primary surface texture on substantially the entire outer surface, and a plurality of secondary cuspations in addition to the primary surface texture.

In yet another embodiment, a method of forming a core sheet for use within a fluid treatment unit comprises providing a sheet of material having substantially flat and smooth surfaces. The substantially flat sheet is directed between a pair of rollers with cooperative texturizing surfaces to impart primary texturized surfaces on the sheet, thereby forming a texturized sheet. Secondary cuspations are then formed in the texturized sheet to form a texturized cuspated sheet. The texturized cuspated sheet is optionally cut to a preferred dimension.

BRIEF DESCRIPTION OF THE DRAWINGS

Aspects of the preferred embodiments will be described with reference to the Drawings, where like numerals reflect like elements:

FIG. 1 shows an example of a flat polymeric core sheet material typically used as a starting material for forming cuspated core sheets in accordance with the disclosure;

FIG. 2 shows an exemplary cuspated core sheet as known in the prior art;

FIG. 11 is a first example of a fluid drainage units within which the inventive core sheets are configured for use; and FIG. 12 is another example of a fluid drainage units within which the inventive core sheets are configured for use.

DETAILED DESCRIPTION

Figure 3:
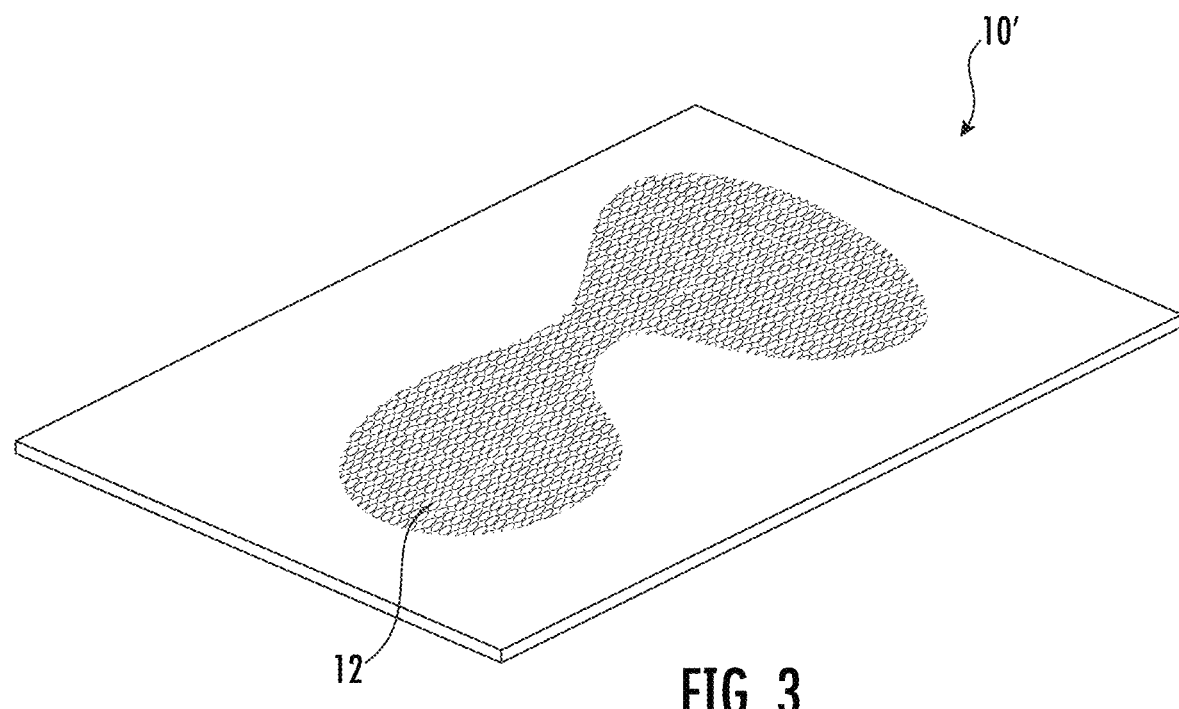
FIG. 3 shows a core sheet with a texturized primary surface and without cuspations.

Among the benefits and improvements disclosed herein, other objects and advantages of the disclosed embodiments will become apparent from the following wherein like numerals represent like parts throughout the several figures. Detailed embodiments of a textured core sheets for use within fluid drainage and treatment systems are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

As background to the inventive textured cuspated core sheets described herein and shown generally as reference numeral 10, it is understood that they are configured to be used in cooperation with elements in fluid treatment systems. Non-limiting examples of appropriate fluid treatment systems within which the textured cuspated core sheets 10 are configured for use include the GSF and Mantis® systems sold by Eljen Corporation of Windsor, Connecticut, examples of which are shown in FIGS. 11 and 12. However, the inventive core sheets 10 can be incorporated into any number of other wastewater treatment systems for distribution, support and treatment. Exemplary installations, uses and additional aspects of these types of systems are described in co-owned U.S. Pat. Nos. 8,104,994 and 6,048, 131, and U.S. patent application Ser. No. 16/732,392, disclosures of which are incorporated herein by reference for background. Still further, the feature of a primary surface texture on core sheets 10 may be employed in other varieties of drainage systems, including plastic chambers, to encourage growth of biomat-like organic deposits from bio-impacted fluid for enhancing treatment efficacy of the respective system.

The exemplary treatment systems, like the GSF and Mantis® systems respectively shown in FIGS. 11 and 12, utilize core sheets as internal support around which fluid-permeable fabric is wrapped. The fluid is maintained within the module or channel provided by the core material and gradually passes through the fabric layers and eventually into the external environment of sand, soil or other backfill that surrounds each treatment system or module. The systems are all generally self-supporting and self-contained and comprise cuspated polymeric core sheets because the sheets are non-absorbent, and surrounding layers of treatment fabric, that allow fluid flow and air movement into the surrounding environment (backfill) through the fabric layer. Over time, organic deposits develop primarily on the surface of the fabric (the interface between the fabric and surrounding soil), commonly referred to in the fluid treatment field as a biomat layer. The biomat layer is a significant contributor for naturally (passively) treating bio-related fluid, such as septic fluid or drainage, in the soil and which make the products useful for their intended purpose.

Within the GSF and Mantis® system embodiments shown in FIGS. 11 and 12, the prior art distribution media is formed of several polymeric core sheets 20 with cuspated configuration, somewhat similar in appearance to an egg crate. The cuspation peaks are shown graphically as reference numeral 24 in the non-textured products shown in FIGS. 2, 11 and 12. In practice, embodiments exist with cuspations in both relative directions of the sheet surface and may be formed via sets of pistons or plungers punching the opposite surfaces from opposite sides of a flat sheet toward one another. Commonly, the flat sheet is fed from a roll and heated above ambient temperature such that it is in a somewhat malleable state prior to punching. While the depicted embodiments show cuspation peaks 24 that are flat and solid, embodiments of the inventive core sheets 10 exist with holes or slots in at least a portion of the peaks. The holes further aid fluid surface retention, and thus growth of biomaterial.

The non-absorbent support media (core sheets 20) is commonly referred to as "distribution media" while the fabric 26 in the system is referred to as "treatment media." Previously, it was believed only treatment media contributed to treatment of wastewater effluent, and that the distribution media only contributed to support of the system and distribution of the effluent. It has since been discovered that organic deposits can build up on the core sheets themselves in addition to on the fabric treatment media (biomat). Surfaces of core sheets that are exposed to the most wastewater for a longer duration of time have been shown to build up the most organic deposits. However, the smooth surfaces 22 of the prior art core sheets do not promote adherence of the fluid effluent to it as the fluid is received from a drainpipe or conduit.

Figure 4:
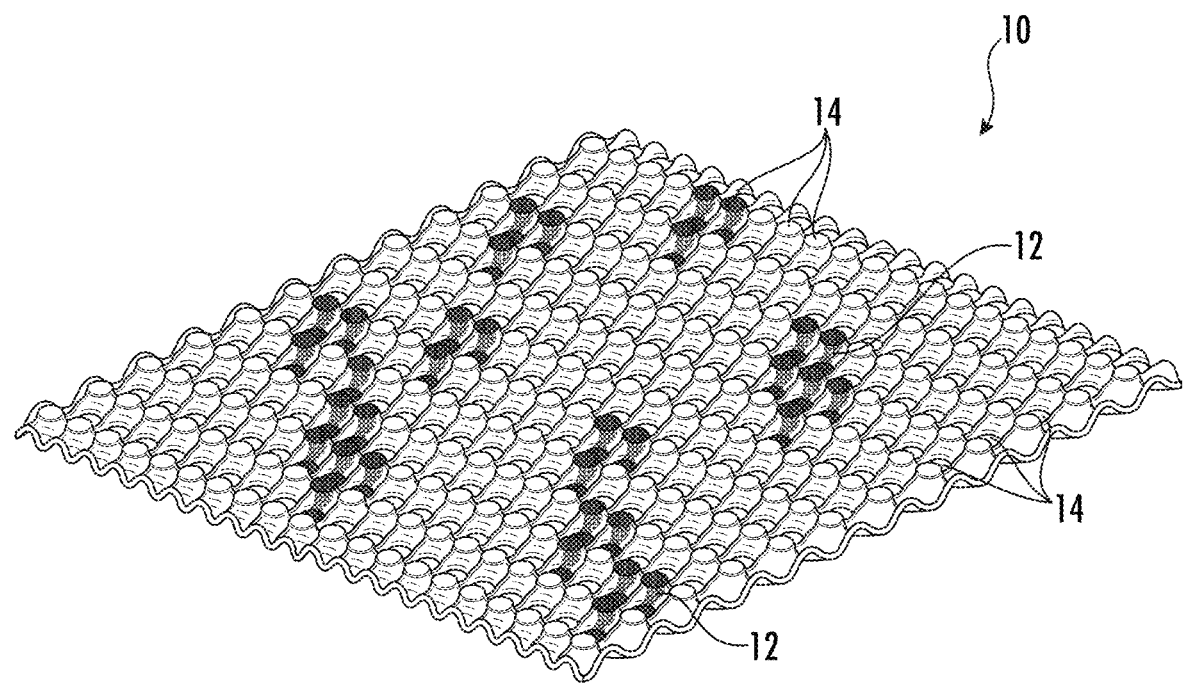
FIG. 4 shows a cuspated core sheet with texturized primary surface according to the disclosure.
Figure 5:
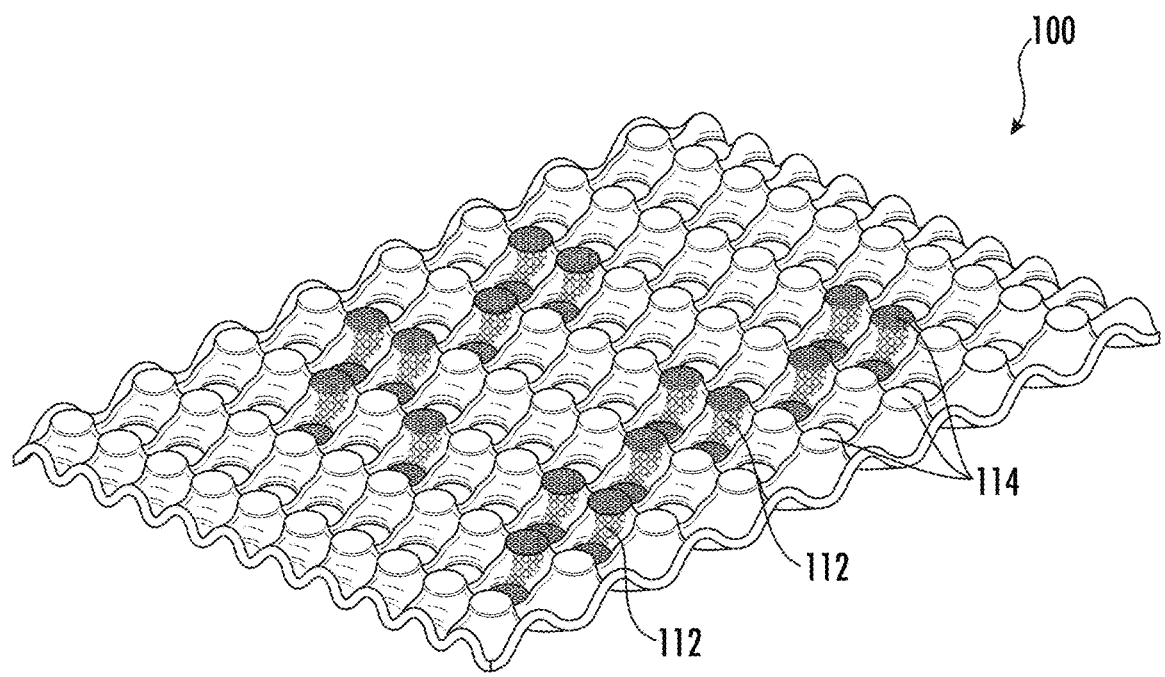
FIG. 5 shows another embodiment of a cuspated core sheet with texturized primary surface.
Figure 6:
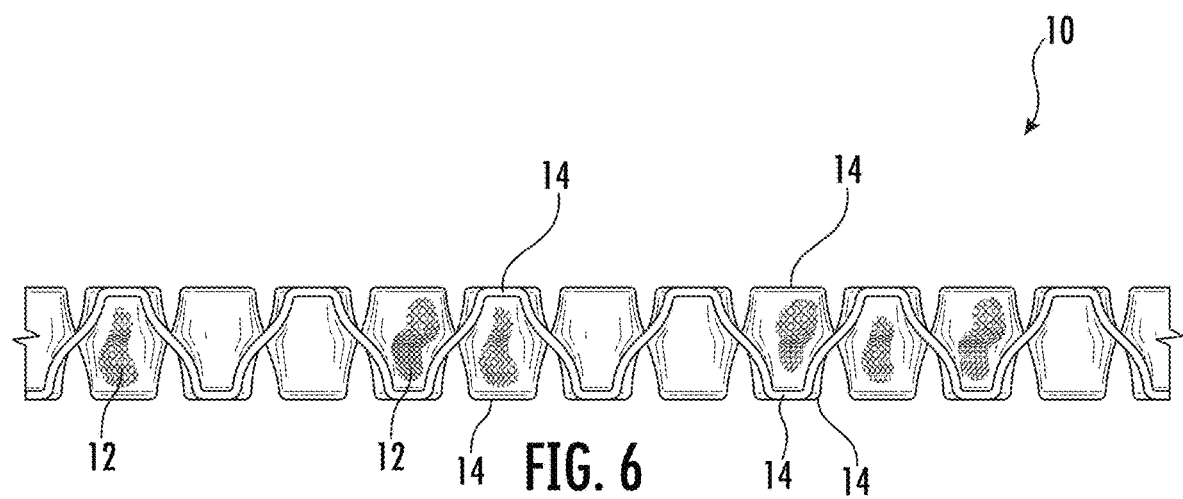
FIG. 6 depicts the texturized cuspated core sheet of FIG. 5 from a side edge view.

With reference to FIG. 4, a core sheet 10 is provided with a primary textured or rough surface 12 and secondary cuspations 14, which appear as larger peaks and valleys in FIGS. 4-6. The textured surface may include a variety of surface irregularities such as one or more of fine undulations, dents, crevices, peaks, points, dimples, scrapes, scratches, perforations, pores, and micropores. The primary textured surface 12 has been shown to promote adhesion of bio-impacted fluid and lead to an additional buildup of biomat-like organic material on the internal core sheets 10 in addition to on the fabric-soil interface, thereby increasing the efficacy and overall treatment capacity of a given system. Typically, the core sheet 10 is formed from a flat sheet 10' that has undergone a texturizing step to add the surface irregularities 12 that form the primary textured surface.

One process for forming the cuspated core sheets that are currently known in the art and which are shown in the products of FIGS. 5 and 6 is in an assembly line process that starts with raw rolled flat polymeric sheet material 30 with a smooth surface 32, similar to that shown in FIG. 1. The flat sheet 30 undergoes a heating step wherein it is heated above ambient temperature in a heating unit (B), which may be a heated roller, to impart a malleability property to the raw polymeric starting material. In the known process, the heated flat sheet is fed from the heater (B) to a cuspation forming unit (D) that includes several plungers or pistons on each side of the sheet that move relative to each other from one surface side of the sheet toward the other to "punch" cuspations 24 as shown in FIGS. 2 and 11. The plungers may reciprocate in a single direction from one side of the sheet (to form cuspations in one direction) or from both directions from opposite sides of the sheet (to form cuspations in both directions). The depicted sheet 10 includes secondary cuspations 14 in both directions and surface texture 12 on approximately the entire surface, as seen most clearly in the side view of FIG. 6 (note surface texture is not shown on entire surface in FIGS. 4-6 in the interest in more clearly showing the cuspations). After the sheets are fit with cuspations, the cuspated sheet is fed to a cutting unit (E) for cutting into preferred dimensions for the particular unit within which it will be installed, thereby forming a cuspated core sheet 20.

Figure 7:
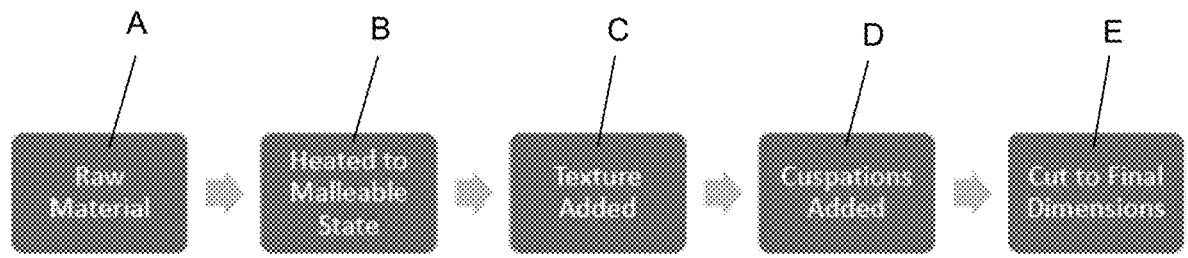
FIG. 7 is a simple flow chart with representative steps of a process of forming the inventive textured core sheets.

With reference to FIG. 7, in the inventive process, a step of adding primary texture to the heated flat sheet material 30 in a texturizing unit (C) is incorporated into the assembly line prior to punching to form the cuspated contour (D). Multiple specific embodiments of a texturizing unit (C) exist, including without limitation, a roller unit with one or more irregular surfaced rollers, a stamping unit with irregular platform surfaces, and a tooth projection unit (for forming scrapes in the surface). After the texturizing step (C), the texturized flat sheet is fed to the cuspation forming unit (D), and then to the cutting unit (E). The end product is a cuspated core sheet 10 with textured surface 12 and cuspations 14 useful for promoting surface retention of the wastewater fluid and eventual buildup of biomaterial for enhanced treatment when incorporated into passive wastewater treatment systems.

Figure 8:
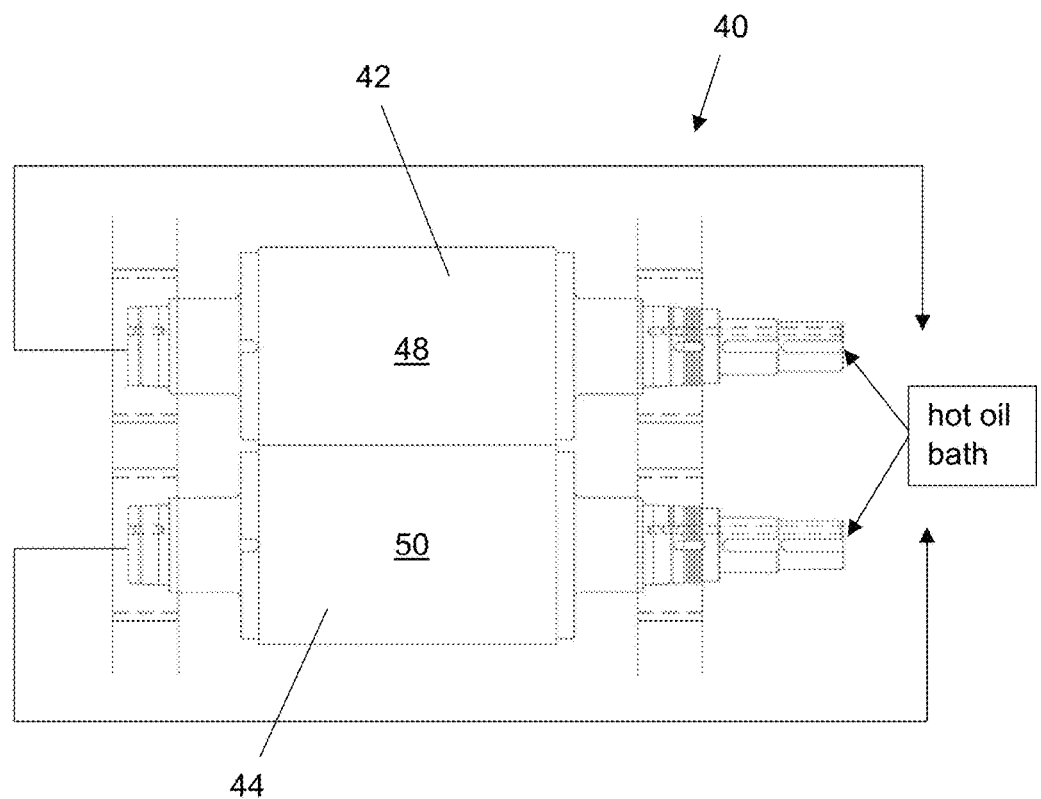
FIG. 8 depicts a representative embossing roller assembly for use in providing the texturized surface on the core sheets.
Figure 10:
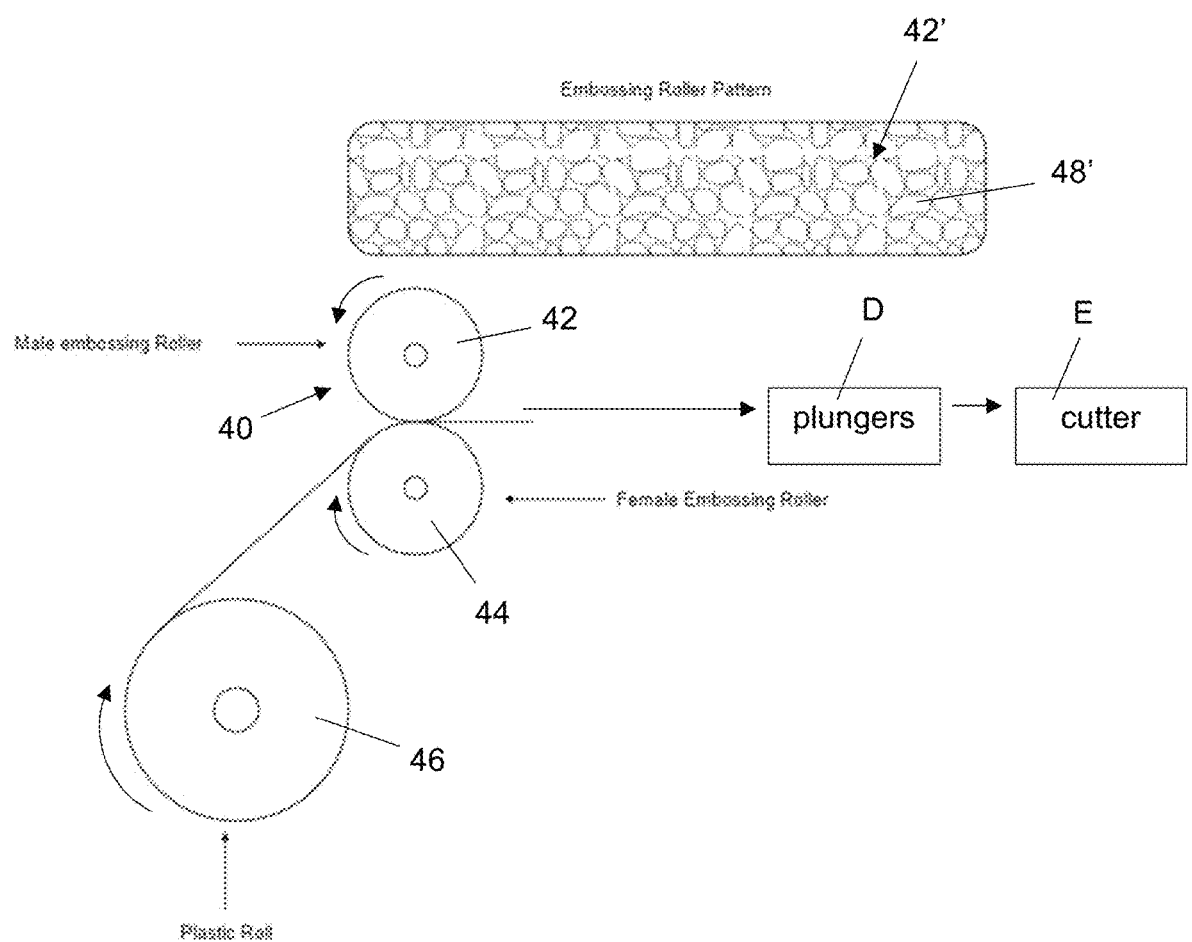
FIG. 10 depicts an exemplary embossing roller assembly and line for use in providing texture to the surface of core sheets and a representative roller pattern.

FIG. 8 depicts a representative heated embossing rolling assembly 40 used to form the primary texturized surface 12 on the disclosed sheets 10, and FIG. 10 depicts a system within which the heated roll assembly 40 is utilized. As shown, the rolling assembly includes a first (male) roller 42 and a corresponding second (female) roller 44. In a preferred embodiment, hot oil is circulated through the interior of the rollers, 42 and 44, to heat the surfaces of the rollers that receive the flat polymer sheet 40 starting material fed from a roll 46 upstream of the heated rolling assembly 40. In a preferred embodiment, the hot oil is fed through serpentine channels arranged on the inner wall surface the respective rolls, however this particular configuration of oil delivery and heating is non-limiting. In the assembly line of FIG. 10, the flat textured sheet material is fed directly from the rolling assembly 40 to the punching unit or plungers D to form the dual sided cuspations 14, and thereafter cut to desired dimensions for incorporation into a wastewater treatment unit. As also shown in FIG. 8, the hot oil may be flowed cyclically through the respective rollers and returned back to an initial bath from which oil is again flowed to the rollers.

Figure 9:
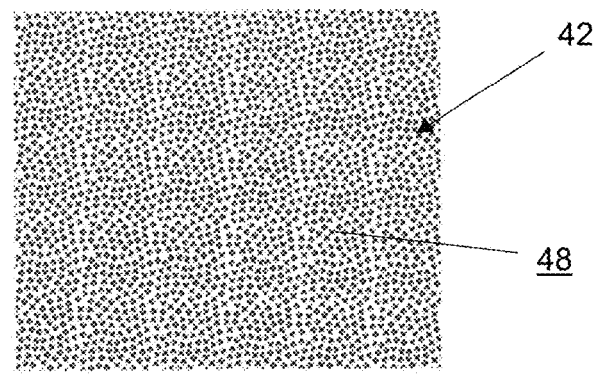
FIG. 9 is a representation of a surface of a roller showing a pattern of peaks for creating surface texture.

In the rolling assembly 40 of FIG. 8, the first roll 42 is the male roll and includes a series of projections, like the irregular projections shown as black dots in FIG. 9. The second roll 44 is the female roll and includes surface indentations, each of which corresponds to a projection in the first roll 42. As such, a flat sheet 30 fed through the texturizing rolling assembly 40 between the first and second rollers is fit with surface undulations approximately matching the pattern of the projections shown in FIG. 9. Another roller pattern for creating a comparable surface texture pattern is shown in the upper portion of FIG. 10. As one can readily understand, the patterns shown in FIGS. 9 and 10 are merely exemplary, as virtually any number of different patterns can be utilized.

Like the primary texture, various specific forms of secondary structure exist without departing from the inventiveness of the core sheets disclosed herein. For example, in another non-limiting embodiment, the secondary structure takes the form of a wave shape across a length of a texturized core sheet, rather than individual cuspations formed by plungers.

When incorporated into passive wastewater treatment units with layers of filter fabric 26, like the GSF and Mantis® systems discussed above, for example, the disclosed core sheets 10 with texturized primary surface 12 and secondary cuspations 14 have shown a significant increase in surface buildup of biomaterial as compared to cuspated core with smooth surface, like that shown generally as reference numeral 20 and previously utilized in such passive systems as structural members. Bio-impacted fluid is retained on the textured primary surface 12 more effectively compared to the smooth surface of the prior art core sheets 20, especially in the areas around the cuspations 14. This causes a denser and more rapid buildup of organic deposits, which, along with the biomat layer at the fabric-soil interface, improves treatment of the wastewater effluent received by the system.

In another embodiment, a flat sheet 30 is run through a pair of rollers with cooperative teeth and cavities for forming small slits, micro-slits, micropores or similar in the sheet to yield the primary texturized surface, rather than surface indentations or undulations.

Another embodiment comprises only a single roll with teeth over which a flat sheet 30 rolls to form slits, micro-slits, micropores or similar.

The disclosed core sheet 10 with primary textured surface 12 and secondary cuspations 14 are primarily configured to be used within wastewater treatment units or systems as support, wherein the sheets are subject to wastewater flow when the respective wastewater unit is connected to a wastewater source. For example, in a unit like that shown in FIG. 12, one or more core sheets 10 are arranged upright and adjacent one another (in place of the non-textured cuspated core sheets 20 known in the prior art) and then wrapped in fabric 26 to form a module. As shown, a pipe may extend through a front and rear face of each module. The pipe may include one or more holes aligned with the inner area of each module (between the fabric) and be fluidly connected to a source of wastewater, thereby introducing wastewater to the textured cuspated core sheets 10. The textured surface 12 of the core sheets 10 improves surface fluid retention and promotes growth of biomaterial, which in turn enhances the treatment efficacy of each wastewater unit relative to a comparable prior art unit without textured core sheets. In this manner, it can be said that the textured cuspated core sheets 10 provide a cyclical treatment advantage over comparable non-textured core sheets.

In units like that depicted in FIG. 11, with serpentine fabric 26 wrapping textured cuspated core sheets 10, a pipe is typically placed on top of the unit for delivery of wastewater to the unit via gravity, with at least a portion of the wastewater being directed to the core sheets.

The specific units or systems shown in FIGS. 11 and 12 are merely exemplary of the types of wastewater treatment systems within which the inventive textured and cuspated core sheets 10 are configured for use. Numerous other specific systems and units exist within which the core sheets 10 can be used to enhance wastewater treatment efficacy. Additionally, numerous other specific wastewater delivery mechanisms are possible within similar systems, including delivery from the side, bottom and/or any combination of the disclosed delivery mechanisms. For example, as noted above, ATUs may incorporate upright core sheets 10 to enhance surface adherence of fluid and thus, improve growth of biomaterial. Core sheets 10 may be wrapped around a distribution pipe or placed intermediate a distribution pipe and other treatment units.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fluid treatment unit, comprising:
   one or more core sheets arranged adjacent and substantially parallel to one another, each core sheet having an outer surface; and
   one or more layers of fabric adjacent and abutting one of the one or more core sheets, wherein
   the core sheets have a primary surface texture on substantially the entire outer surface,
   the primary surface texture comprises surface irregularities,
   the fluid treatment unit is configured to direct wastewater into contact with the core sheets when connected to a source of said wastewater,
   the core sheets have secondary structure different from the primary surface texture, and
   the secondary structure takes the form of one or more cuspations.

2. The fluid treatment unit of claim 1, wherein the secondary structure comprises a plurality of cuspations.

3. The fluid treatment unit of claim 2, wherein the plurality of cuspations includes a first set in a first direction and a second set in a second direction opposite the first direction.

4. The fluid treatment unit of claim 1, wherein the surface irregularities include one or more of undulations, dents, crevices, peaks, dimples, points, scrapes, scratches, perforations, pores, and micropores.

5. The fluid treatment unit of claim 4, wherein the surface irregularities are formed as a series of undulations or dents.

6. The fluid treatment unit of claim 1, wherein the surface irregularities are formed via a pair of cooperative rollers between which a flat sheet is rolled.

7. The fluid treatment unit of claim 1, wherein multiple of the core sheets are arranged adjacent one another and substantially upright to form a channel with a layer of fabric wrapped around at least two surfaces of the channel.

8. The fluid treatment unit of claim 7, further comprising a fluid delivery conduit configured to be coupled to a source of wastewater and to direct wastewater fluid from the source into the channel.

9. The fluid treatment unit of claim 1, wherein
   multiple of the core sheets are arranged adjacent one another and substantially upright to form a channel with a layer of fabric wrapped around at least two surfaces of the channel,
   the channel has a pipe extending through at least two surfaces thereof, and
   the pipe is configured to deliver wastewater to the channel between the fabric wrapped surfaces when fluidly connected to a source of wastewater.

10. The fluid treatment unit of claim 1, wherein the surface irregularities take the form of irregular indentations or undulations across the surface of the core sheet.

11. The fluid treatment unit of claim 1, wherein the one or more core sheet is formed by a process comprising:
    (a) providing a substantially flat sheet of material having smooth surfaces;
    (b) directing the substantially flat sheet between a pair of rollers with cooperative texturizing surfaces to impart surface irregularities on the surfaces of the sheet and thereby forming a texturized sheet;
    (c) forming secondary cuspations in the texturized sheet; and
    (d) optionally cutting the texturized sheet to a preferred dimension.

12. The fluid treatment unit of claim 11, wherein the secondary cuspations are formed via plungers pressing one or more surfaces of the texturized sheet.

13. The fluid treatment unit of claim 1, wherein the one or more core sheets are formed from a plastic material.

14. The fluid treatment unit of claim 7, wherein fabric is wrapped around more than two surfaces of the channel.

15. The fluid treatment unit of claim 7, wherein fabric is wrapped around all surfaces of the channel.

16. The fluid treatment unit of claim 7, further comprising a plurality of channels each formed from multiple of the core sheets arranged adjacent one another and substantially upright with fabric on a front surface of each channel and fabric on a rear surface of each channel, wherein each channel is arranged with spacing between the fabric on its front surface and the fabric on the rear surface of an adjacent channel.

17. The fluid treatment unit of claim 7, wherein the surface irregularities include one or more of undulations, dents, crevices, peaks, dimples, points, scrapes, scratches, perforations, pores, and micropores.

18. The fluid treatment unit of claim 8, wherein the channel defines an upper boundary, and the fluid delivery conduit is positioned above the upper boundary.

19. The fluid treatment unit of claim 8, wherein the channel defines an upper boundary, and the fluid delivery conduit is positioned below the upper boundary.

20. The fluid treatment unit of claim 1, further comprising a plurality of channels, each channel being formed from multiple of the core sheets arranged adjacent one another and substantially upright, and the one or more layers of fabric comprises at least one layer of fabric wrapped in a serpentine shape throughout the fluid treatment unit.

21. A fluid treatment unit, comprising:
one or more core sheets arranged adjacent and substantially parallel to one another, each core sheet having an outer surface; and
a fluid delivery conduit configured to be coupled to a source of wastewater and to direct wastewater fluid from the source to the fluid treatment unit, wherein
the core sheets have a primary surface texture on substantially the entire outer surface,
the primary surface texture comprises surface irregularities,
the core sheets have secondary structure different from the primary surface texture, and
the secondary structure takes the form of one or more cuspations.

22. The fluid treatment unit of claim 21, wherein the secondary structure comprises a plurality of cuspations with at least one cuspation in a first direction and at least one cuspation in a second direction opposite the first direction.

23. The fluid treatment unit of claim 21, wherein the surface irregularities include one or more of undulations, dents, crevices, peaks, dimples, points, scrapes, scratches, perforations, pores, and micropores.

24. The fluid treatment unit of claim 23, wherein the surface irregularities are formed as a series of undulations or dents.

25. The fluid treatment unit of claim 21, wherein multiple of the core sheets are arranged adjacent one another and substantially upright to form a channel for receipt of wastewater.

26. The fluid treatment unit of claim 25, further comprising:
a plurality of channels each formed from multiple of the core sheets arranged adjacent one another and substantially upright, and
at least one layer of fabric wrapped in a serpentine shape throughout the fluid treatment unit.

27. The fluid treatment unit of claim 26, wherein the fluid delivery conduit comprises an elongate pipe with holes, is positioned above an upper boundary of the respective channels, and is configured to deliver wastewater from the source to the channels.

28. The fluid treatment unit of claim 21, wherein the one or more core sheets are formed from a plastic material.

* * * * *